(12) United States Patent
Jayaraman

(10) Patent No.: US 8,553,588 B2
(45) Date of Patent: Oct. 8, 2013

(54) SYSTEM AND METHOD FOR LAWFUL INTERCEPTION IN VOICE CALL CONTINUITY FOR TELECOMMUNICATION NETWORKS

(75) Inventor: Venkata Subramanian Jayaraman, Chennai (IN)

(73) Assignee: Wipro Limited, Bangalore (IN)

( * ) Notice: Subject to any disclaimer, the term of this patent is extended or adjusted under 35 U.S.C. 154(b) by 154 days.

(21) Appl. No.: 13/076,530

(22) Filed: Mar. 31, 2011

(65) Prior Publication Data

US 2012/0250584 A1 Oct. 4, 2012

(51) Int. Cl.
*H04L 12/16* (2006.01)

(52) U.S. Cl.
USPC ......... 370/259; 370/229; 370/230; 370/230.1

(58) Field of Classification Search
None
See application file for complete search history.

(56) References Cited

U.S. PATENT DOCUMENTS

| | | | | |
|---|---|---|---|---|
| 7,565,146 | B2* | 7/2009 | Seurujavi et al. | 455/445 |
| 7,843,902 | B2* | 11/2010 | Imbimbo et al. | 370/352 |
| 2002/0150096 | A1* | 10/2002 | Sjoblom | 370/389 |
| 2008/0037501 | A1* | 2/2008 | Ali et al. | 370/342 |
| 2008/0220754 | A1* | 9/2008 | Erol et al. | 455/417 |
| 2008/0275988 | A1* | 11/2008 | Zheng | 709/224 |
| 2009/0268722 | A1* | 10/2009 | Gallagher et al. | 370/352 |
| 2012/0069971 | A1* | 3/2012 | Jayaraman et al. | 379/35 |
| 2012/0250584 | A1* | 10/2012 | Jayaraman | 370/259 |
| 2012/0290829 | A1* | 11/2012 | Altman | 713/150 |

FOREIGN PATENT DOCUMENTS

| | | |
|---|---|---|
| EP | 03818594.8 B1 | 5/2009 |
| WO | WO2008080335 | 7/2008 |
| WO | PCT/US2010/001336 A1 | 11/2010 |

OTHER PUBLICATIONS

Andro Milanovic',Methods for Lawful Interception in IP Telephony Networks Based on H.323,School of Electrical Engineering and Computing University of Zagreb, entire document, Cisco Systems Inc.,Croatia, pp. 1-5 dated 2003.
Andro Milanovic',Distributed System for Lawful Interception in VoIP Networks,School of Electrical Engineering and Computing University of Zagreb, entire document, Cisco Systems Inc.,Croatia, pp. 1-4 dated 2003.
Gavrilovic et al., "Standard Based Solutions for Voice and SMS Services over LTE," 6 pp., MIPRO 2010, May 24-28, 2010, Opratija, Croatia.

* cited by examiner

*Primary Examiner* — Robert Wilson
(74) *Attorney, Agent, or Firm* — LeClairRyan, a Professional Corporation

(57) ABSTRACT

A system and method for providing lawful interception (LI) data in voice call continuity for telecommunication networks are disclosed. In one embodiment, the data associated with a registered telecommunication network user (i.e., target user) coming from a first telecommunication network is intercepted by a VCC gateway. Further, the intercepted data is sent to the LEA in a format desired by the LEA. Furthermore, the VCC gateway is configured based on a successful determination of network properties associated with the second telecommunication network upon the target user moving to the second telecommunication network. The second telecommunication network is based on a technology that is different from the first telecommunication network. In addition, the data associated with the target user coming from the second telecommunication network is continuously intercepted by the VCC gateway and continuously sent to the LEA by the VCC gateway in the format desired by the LEA.

18 Claims, 7 Drawing Sheets

SYSTEM AND METHOD FOR LAWFUL INTERCEPTION IN VOICE CALL CONTINUITY FOR TELECOMMUNICATION NETWORKS

BACKGROUND

Even with the advancement of telecommunication networks towards long term evolution (LTE) and other such advanced technologies, there is still a requirement for maintaining call continuity across various networks. Further, the term "network convergence" is becoming very popular in the advanced telecommunication networks. Furthermore, the concept of "voice call continuity" (VCC) is starting to emerge from a cell-to-cell movement towards a network-to-network movement. The VCC requires maintaining a voice call during the network-to-network movement when the telecommunication networks are based on various technologies. For example, the VCC requires seamlessly maintaining a voice call when a user/subscriber moves from one telecommunication network that is based on one technology, for example, a second generation (2G) network or a WiMax based network to another telecommunication network that is based on another technology, for example, a third generation (3G) network or a Wi-Fi based network.

Based on existing technologies, in the above-described scenario, if a user/subscriber moves from one network to another network and the user is lawfully intercepted by a law enforcement agency (LEA), such a lawfully intercepted call cannot be re-established and maintained in the network-to-network movement during the entire period without the user knowing it. This is because the infrastructure needed for doing lawful interception of a call is not unified and varies based on different technologies and the real-time communication may go from circuit switching to packet based switching. Further, the telecommunication networks based on different technologies operate under different frequency ranges. Furthermore, the interface protocols needed between telecommunication networks based on different technologies and mobile stations operate under different standards. Typically in such a scenario, the call may either get dropped or the LEA may be unable to continue the lawful interception of the call. In both the scenarios, the LEA can lose the needed important data/voice associated with the conversation of the lawfully intercepted user/subscriber.

SUMMARY

A method for providing voice call continuity (VCC) for lawful interception (LI) data includes receiving, by a VCC device, a first duplicate of data associated with a voice call initiated by a user over a first telecommunication network in response to a first duplication request. A movement of the user from the first telecommunication network to a second telecommunication network during the voice call is detected. One or more network properties associated with the second telecommunication network are determined. One or more network properties of the VCC device are reconfigured based on the determined one or more network properties associated with the second telecommunication network. A second duplicate of the data associated with the voice call is received from the second telecommunication network in response to a second duplication request. The received first and second duplicates of the data associated with the voice call are delivered as the LI data to a law enforcement agency (LEA).

A non-transitory computer-readable medium having stored thereon instructions for providing voice call continuity (VCC) for lawful interception (LI) data comprising machine executable code which, when executed by a processor, causes the processor to perform steps including receiving, by a VCC device, a first duplicate of data associated with a voice call initiated by a user over a first telecommunication network in response to a first duplication request. A movement of the user from the first telecommunication network to a second telecommunication network during the voice call is detected. One or more network properties associated with the second telecommunication network are determined. One or more network properties of the VCC device are reconfigured based on the determined one or more network properties associated with the second telecommunication network. A second duplicate of the data associated with the voice call is received from the second telecommunication network in response to a second duplication request. The received first and second duplicates of the data associated with the voice call are delivered as the LI data to a law enforcement agency (LEA).

A voice call continuity (VCC) device comprising a memory coupled to a processor configured to execute programmed instructions stored in the memory including receiving, by a VCC device, a first duplicate of data associated with a voice call initiated by a user over a first telecommunication network in response to a first duplication request. A movement of the user from the first telecommunication network to a second telecommunication network during the voice call is detected. One or more network properties associated with the second telecommunication network are determined. One or more network properties of the VCC device are reconfigured based on the determined one or more network properties associated with the second telecommunication network. A second duplicate of the data associated with the voice call is received from the second telecommunication network in response to a second duplication request. The received first and second duplicates of the data associated with the voice call are delivered as the LI data to a law enforcement agency (LEA).

BRIEF DESCRIPTION OF THE DRAWINGS

Various embodiments are described herein with reference to the drawings, wherein.

DETAILED DESCRIPTION

Figure 1:
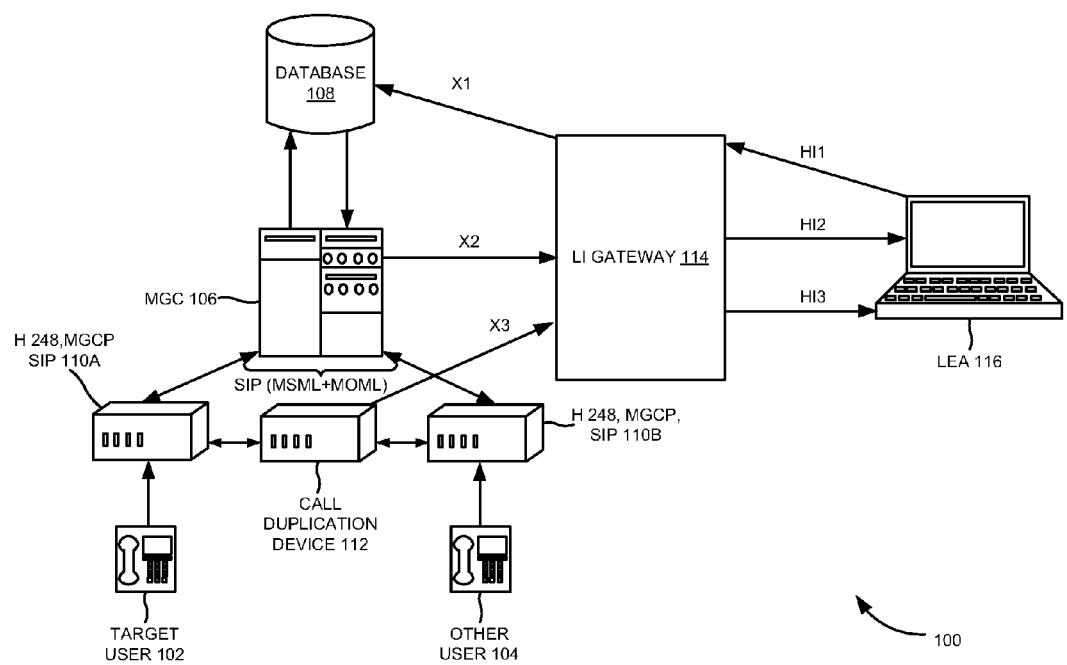
FIG. 1 is a block diagram illustrating providing lawful intercepted (LI) data in a VOIP/Wi-Fi network movement scenario.

A system and method for lawful interception (LI) in voice call continuity (VCC) for telecommunication networks is disclosed. In the following detailed description of the embodiments of the present subject matter, reference is made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

In the document, the terms "registered telecommunication network user" and "target user" are used interchangeably throughout the document. Further, the term "VCC" refers to voice call continuity which requires maintaining a voice call when a mobile terminal (e.g., a user) is moving from one cell to another. In this case, the another/neighboring cell can use the same technology or a different technology to the one the user has originated the call. For example, moving from a second generation (2G) to a third generation (3G) network (i.e., same technology scenario) or moving from a WiMax to a Wi-Fi network (i.e., different technology scenario) and so on.

Furthermore, the term Lawful interception (LI) refers to a legally sanctioned official access to private communications, such as telephone calls, e-mail messages, and the like. In general, LI is a security process in which a network operator or service provider gives law enforcement officials/law enforcement agencies (LEA) access to the communications of private individuals or organizations. The LEA often interacts with both network access (i.e., typically managed by a network access provider (AP), who's infrastructure relies on that of a network operator, such as an incumbent telecom operator, local cable TV service, or wireless services operator) and network services (such as E-mail, chat, and Wi-Fi) to intercept the target user's call.

Further, the terminology "Handover Interface 1 (HI1)" refers to an interface for administrative information. The HI1 transports all kinds of administrative information from/to the law enforcement agencies (LEA) and network operators (NOW). The HI1 port can be used for the transmission of the request to establish or to remove the interception action from the LEA to the NWO or service provider (SP). In case if the automatic transmission between the LEA and NWO/SP is not possible for some reasons, the HI1 port supports manual transmission (e.g., voice, fax, etc.) and not only focuses on automatic transmission from/to the law enforcement mediation function (LEMF) and the NWO/SP facility.

Further, the terminology "Handover Interface 2 (HI2)" refers to an interface for intercept related information (IRI). The HI2 transports all IRI. The HI2 interface is used to transmit information or data associated with the telecommunication services of the identified target user apparent to the network. The HI2 includes signaling information used to establish the telecommunication service and to control its progress (e.g., target identification, identifications of the other party's communication, basic service used, direction of the call or the event, answer indication and/or release causes, time stamps, and the like). If available, further information such as supplementary service information or location information may be included.

For example, the IRI record type includes record type description, begin record at the first event of the call or service attempt, end record at the end of the call or service attempt, continue record at any time during the call or service attempt (e.g., in-call service activation/deactivation), report record if no call association is available (e.g. activation/deactivation of features, use of a non-call associated service).

Furthermore, the terminology "Handover Interface 3 (HI3)" refers to an interface for content of communication. The HI3 transports the content of the communication of the intercepted telecommunication service to the LEMF. The content of communication shall be presented as a transparent en-Clair copy of the information flow during an established, frequently bi-directional, communication of the interception subject. The HI3 may contain voice or data. The transmission media used to support the HI3 interface is usually associated with a telecommunications network or its access arrangements. In case of failures, the content of communication is lost. The network may not provide any recording functions.

FIG. 1 is a block diagram 100 illustrating providing lawful intercepted data in a VOIP/Wi-Fi network movement scenario. Particularly, FIG. 1 illustrates a target user 102 initiating a call with another user 104 in a VOIP/Wi-Fi network. A media gateway controller (MGC) 106 receives signaling information (e.g., dialed digits) from a media gateway and instructs the media gateway to alert the called party (i.e., the other user 104) to send and receive voice data. The communication protocols used between the MGC 106 and the media gateway include but not limited to gateway control protocol (H.248), media gateway control protocol (MGCP) or session initiation protocol (SIP) (i.e., 110A-B).

In the VOIP/Wi-Fi network, the target user is recognized from a database 108 via the MGC 106 when the target user 102 originates or terminates the call. Further, upon recognizing the target user 102, the target user's speech is tapped by a call duplication device 112 and a real-time transport protocol (RTP) is directly transferred to an LI gateway (LIG) 114 and from there to a LEA 116. In this case, the RTP streams are directly duplicated by the duplication device 112, which is external to the VOIP/Wi-Fi network and the duplicated packet is directly routed towards the LEA 116.

Figure 2:
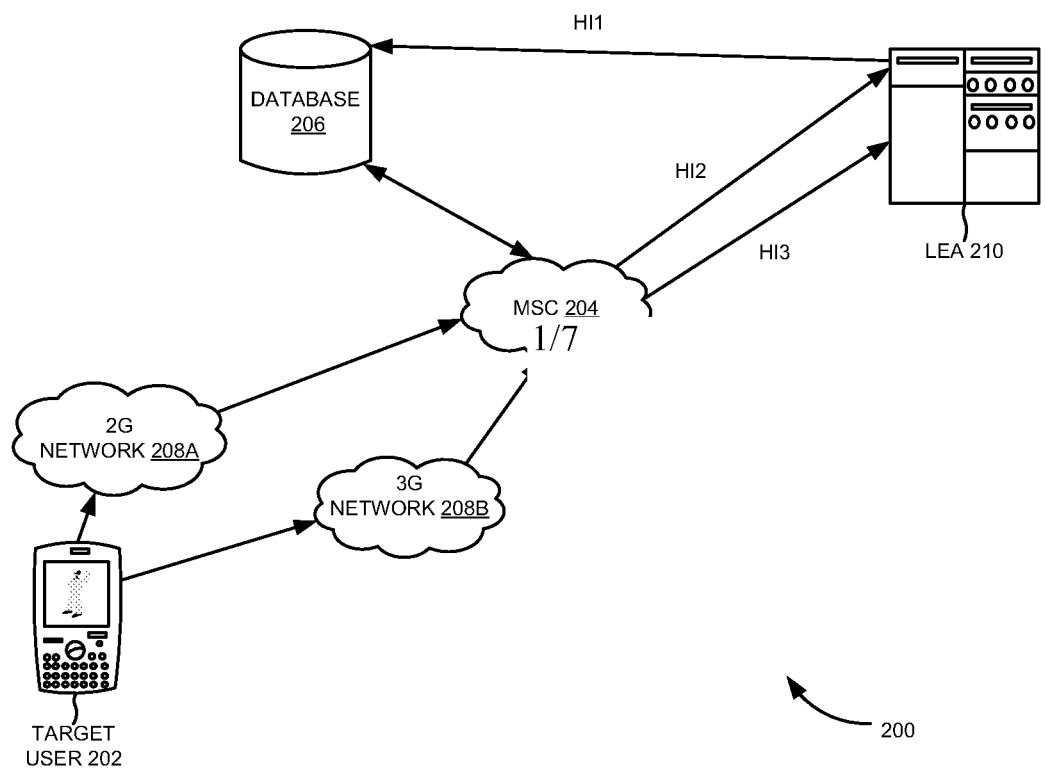
FIG. 2 is a block diagram illustrating providing LI data in a GSM network (e.g., 2G or 3G telecommunication network) movement scenario.

FIG. 2 is a block diagram 200 illustrating providing lawful intercepted data in a GSM network (e.g., 2G telecommunication network 208A or 3G telecommunication network 208B) movement scenario. Particularly, FIG. 2 illustrates a target user 202 initiating a call with another user in a GSM network.

In the GSM network (i.e., 2G telecommunication network 208A or 3G telecommunication network 208B), the target user 202 is recognized by a mobile switching center (MSC) 204 using a database 206 when the target user 202 originates or terminates the call. Further, upon recognizing the target user 202, the target user's speech is transferred from an air interface to the MSC 204. Furthermore, the MSC 204 uses an internal duplication mechanism to convert the user's speech and transfers the converted user's speech to a LEA 210. This delivery mechanism is triggered via a normal #7 signaling link. Further, the interception center in the LEA 210 receives information of the call as a normal #7 signaling call with voice channels.

Figure 3:
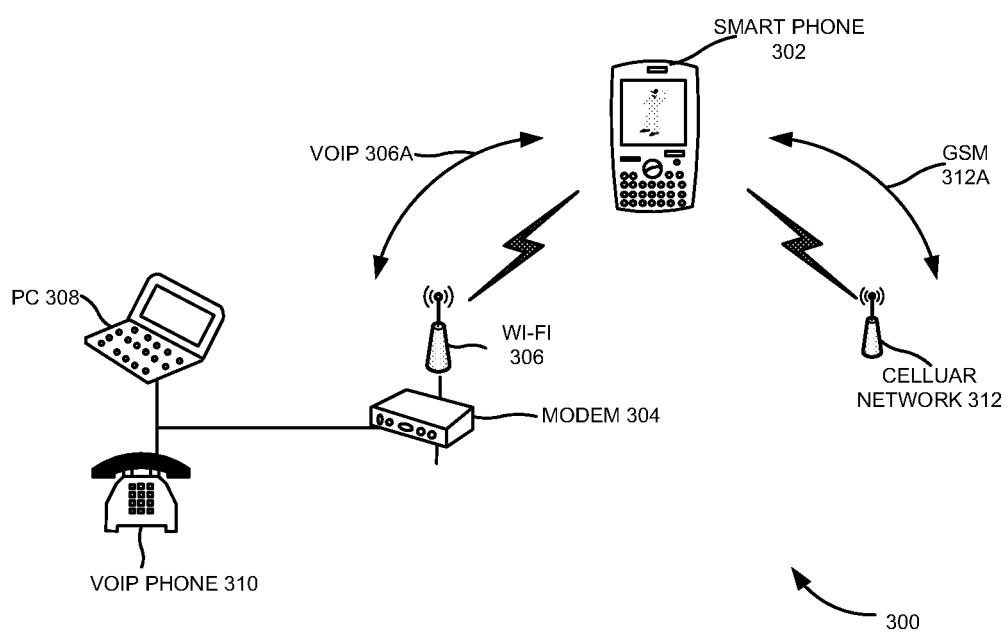
FIG. 3 a block diagram illustrating of a voice call continuity (VCC) being carried in a network-to-network movement environment, in the context of the invention.

FIG. 3 a block diagram 300 illustrating of a voice call continuity (VCC) being carried in a network-to-network movement environment, in the context of the invention. Particularly, FIG. 3 illustrates a smart phone 302 (associated with a target user) seamlessly roaming between a Wi-Fi network 306 and a cellular network 312. Further, FIG. 3 illustrates a modem 304 providing the Wi-Fi network 306 (such as VOIP network 306A) to the smart phone 302, a PC 308 and/or a voice over Internet protocol (VoIP) phone 310. Furthermore, the cellular network 312 includes global system for mobile communications (GSM) network 312A such as 2G or 3G network. The cellular network 312 can also include other networks such as code division multiple access (CDMA) network, advanced mobile phone system (AMPS) network, and so on.

In operation, FIG. 3 illustrates a seamless roaming of the smart phone 302 between the Wi-Fi network 306 and the cellular network 312. In other words, network coverage is available for the smart phone 302 either by Wi-Fi network 306 or by cellular network 312 to ensure voice call continuity (VCC) in a network-to-network movement environment such as when the user moves from the Wi-Fi network 306 to cellular network 312 or vice versa.

For example, consider a basic call handling scenario in case of VCC. A target user (associated with the smart phone 302) initiates the call using a registered telecommunication network, for example GSM network 312A. Further, the call interception is started by the GSM network 312A via a mobile switching center (MSC). Furthermore, the MSC sends the intercepted information/data (i.e., speech content) directly to a law enforcement agency (LEA) which is explained in FIG. 2. The HI2 information is forwarded towards the LEA from a lawful interception management system (LIMS).

Now consider that the target user (e.g., associated with the smart phone 302) moves to the Wi-Fi network 306. In this case, the interception information from the GSM network 312A is not forwarded to the Wi-Fi network 306. Therefore, the interception call by the GSM network 312A is terminated abruptly and hence the intercepted information in the Wi-Fi network 306 cannot be sent any more towards the LEA. However, the target user call still continues in the Wi-Fi network 306.

With respect to FIGS. 1-3, the LI cannot be continued when the user moves from one network to another because of the following reasons:
1. The infrastructure for doing lawful interception (LI) is different in case of GSM and Wi-Fi networks. In GSM network, the mobile switching center is included for HI1 and the LEA 210 directly for HI2 and HI3. In case of GSM network, the MSC 204 uses an internal duplication mechanism to convert the user's speech and transfers the converted user's speech to the LEA 210. In case of the Wi-Fi network, the LIG 114 and call duplication device 112 are situated in between the MGC 106 and the LEA 116. The conversion of the user's speech is done by the LEA. The call duplication device 112 is used for the duplication of data which is controlled by the MGC 106 and these packets are forwarded to LIG 114 and then to LEA 116.
   i. Identifying the lawful interception data is difficult as the target speech still remains in one location and not in both the GSM and Wi-Fi network databases.
2. The underlying technology for communication of the GSM network and Wi-Fi network is different. The GSM network is based on direct conversion of voice and then transfer it to #7 signaling signals and then send it to the LEA. In case of a Wi-Fi network, the packet communication is directly duplicated and duplicated packet is send towards the LEA.
   i. Since the infrastructure is not unified, it not possible to intercept the call continuously during switch over of a call from GSM to Wi-Fi or vice versa.
   ii. The LEA cannot decode both the data as the first part of the data might come as #7 signaling speech from the GSM and the second part would come as packetized data from the Wi-Fi network if the call is moving from GSM to Wi-Fi (integrity of data).
3. LEA does not have any intelligence to accept non standard information.

Therefore, there arises a need to maintain the tracking session across networks having different technologies and to share the complete tracking information among the LEA's of different networks.

Figure 4:
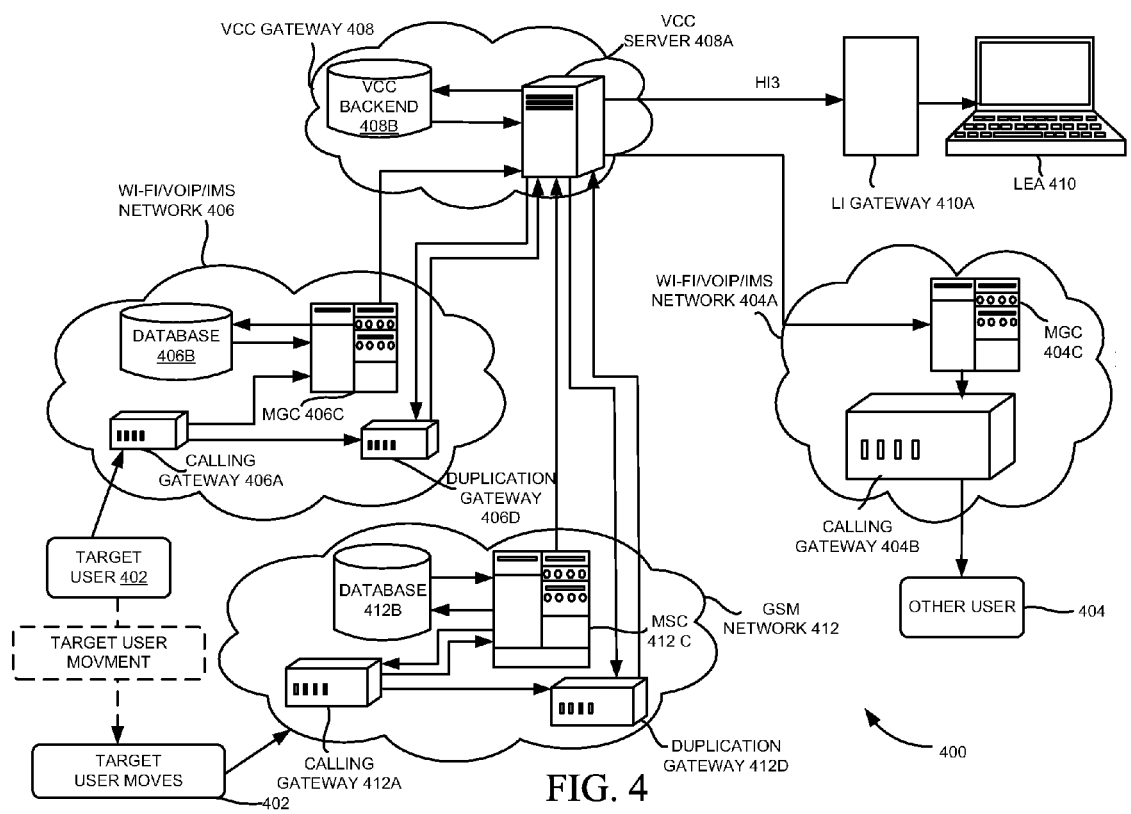
FIG. 4 is a block diagram illustrating providing LI data in a VCC in a Wi-Fi/VOIP network to GSM network movement scenario, according to an embodiment of the invention.

FIG. 4 is a block diagram 400 illustrating providing lawful interception (LI) data in VCC in a Wi-Fi/VOIP network to GSM network movement scenario, according to an embodiment of the invention. Particularly, FIG. 4 illustrates a first telecommunication network (e.g., Wi-Fi/VOIP/IMS network 406), a second telecommunication network (e.g., GSM network 412), a LI gateway 410A associated with a law enforcement agency (LEA) 410, and a VCC gateway 408 coupled to the first telecommunication network 406, the second telecommunication network 412, and the LI gateway 410A. Also, FIG. 4 illustrates another telecommunication network 404A (e.g., Wi-Fi/VOIP/IMS network) including a calling gateway 404B and a MGC 404C associated with a receiving user (i.e., other user 404). In one embodiment, the VCC gateway 408 connects itself to the target user 402 for the HI3 delivery.

Further, the first telecommunication network 406 includes a calling gateway 406A, a database 406B, a MGC 406C and a duplication gateway 406D. Furthermore, the second telecommunication network 406 includes a calling gateway 412A, a database 412B, a MSC 412C and a duplication gateway 412D. Also, the VCC gateway 408 includes a VCC server 408A and a VCC backend 408B.

In operation, the target user 402 originates a call to another subscriber 404 via Wi-Fi/VOIP/IMS network 406. In this case, the VCC gateway 408 is connected to the target user 402 via the first telecommunication network 406. In one embodiment, VCC is a feature which is marked in the profile of the user 402 (i.e., subscriber) that he can use the VCC. Further, if the user 402 is marked as the target user and if he originates or terminates the call, the VCC gateway 408 is activated.

When the target user 402 initiates a call, the VCC gateway 408A monitors the target user 402 continuously. Further, the VCC gateway 408 tunes itself to the HI3 delivery point and always consistently delivers the same intercepted data to the LEA 410 via the LI gateway 410A, for example, even when the target user 402 moves from Wi-Fi/VOIP/IMS network 406 to the GSM network 412 as shown in dotted lines. In this case, if the communication has started in the #7 signaling way then the same can be continued throughout the call in VCC.

In one example embodiment, during the course of this movement the target user 402 cannot feel that he is intercepted because the target user 402 does not feel the switch of technologies. The same is applicable for the LEA 410 because the LEA 410 also gets only a single output throughout the call. In one embodiment, the VCC gateway 408 includes the VCC server 408A and the VCC backend 408B to perform the method described below in FIG. 5.

Figure 5:
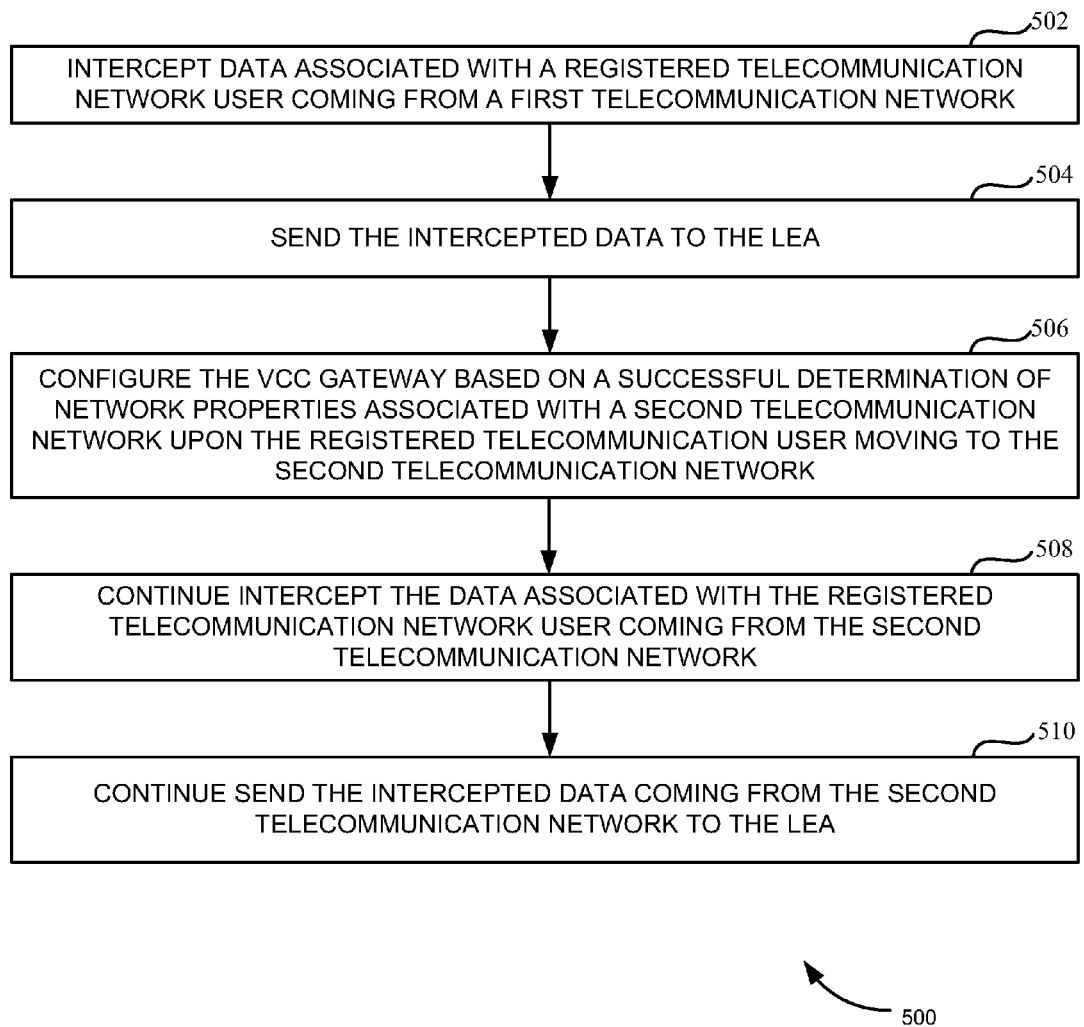
FIG. 5 illustrates a flow diagram of a method for providing LI data in a VCC in telecommunication networks, according to one embodiment of the invention.

FIG. 5 illustrates a flow diagram 500 of a method for providing LI data in VCC in telecommunication networks by a VCC gateway (i.e., such as the VCC gateway 408 of FIG. 4), according to one embodiment of the invention. At block 502, data associated with a registered telecommunication network user (hereinafter refers to as "the target user") coming from a first telecommunication network is intercepted by a VCC gateway upon a successful detection/authentication by a LEA.

For intercepting the data associated with the target user coming from a first telecommunication network, first the data associated with the target user coming from the first telecommunication network is detected. Further, the target user is authenticated by the LEA via a LI gateway. Then, the data associated with the target user is duplicated to the LEA upon a successful authentication.

At block 504, the intercepted data is sent to the LEA by the VCC gateway in a format desired by the LEA. For example, sending the intercepted data to the LEA includes sending the duplicated data associated with the target user to the LEA in a format desired by the LEA.

Now consider that the target user moves to a second telecommunication network. In one embodiment, the second telecommunication network is based on a technology that is different from the first telecommunication network. In one example embodiment, the first telecommunication network and the second telecommunication network are technologies selected from the group consisting of GSM network (i.e., 2G network, 3G network), VOIP network, Wi-Fi network, and WiMax. For example, when the first telecommunication is a GSM network, then the second telecommunication network can be one of the VOIP network, Wi-Fi network and WiMax network.

Further, the VCC gateway determines network properties associated with the second telecommunication network using a VCC backend upon the target user moves to the second telecommunication network. In this case, the movement of the target user from the first telecommunication network to the second telecommunication network is detected by using the VCC backend and the corresponding co-ordinates (i.e., X, Y, Z co-ordinates) of the location information of the target user.

At block 506, the VCC gateway is configured based on a successful determination of the network properties associated with the second telecommunication network when the target user moving to the second telecommunication network. At block 508, intercepting the data associated with the target user coming from the second telecommunication network is continued by the VCC gateway upon configuring itself (i.e., the VCC gateway) based on the network properties associated with the second telecommunication network.

For continuing intercepting the data coming from the second telecommunication network, the data associated with the target user coming from the second telecommunication network is duplicated by the VCC gateway. In one embodiment, the data associated with the target user coming from the second telecommunication network is duplicated towards the LEA when the target user moves from the first telecommunication network to the second telecommunication network.

At block 510, sending the intercepted data coming from the second telecommunication network to the LEA is continued by the VCC gateway in the format desired by the LEA. For continuing sending the intercepted data coming from the second telecommunication network to the LEA includes continuing sending the duplicated data coming from the second telecommunication network to the LEA by the VCC gateway in the format desired by the LEA, thereby sending single output to the LEA throughout the call.

Figure 6:
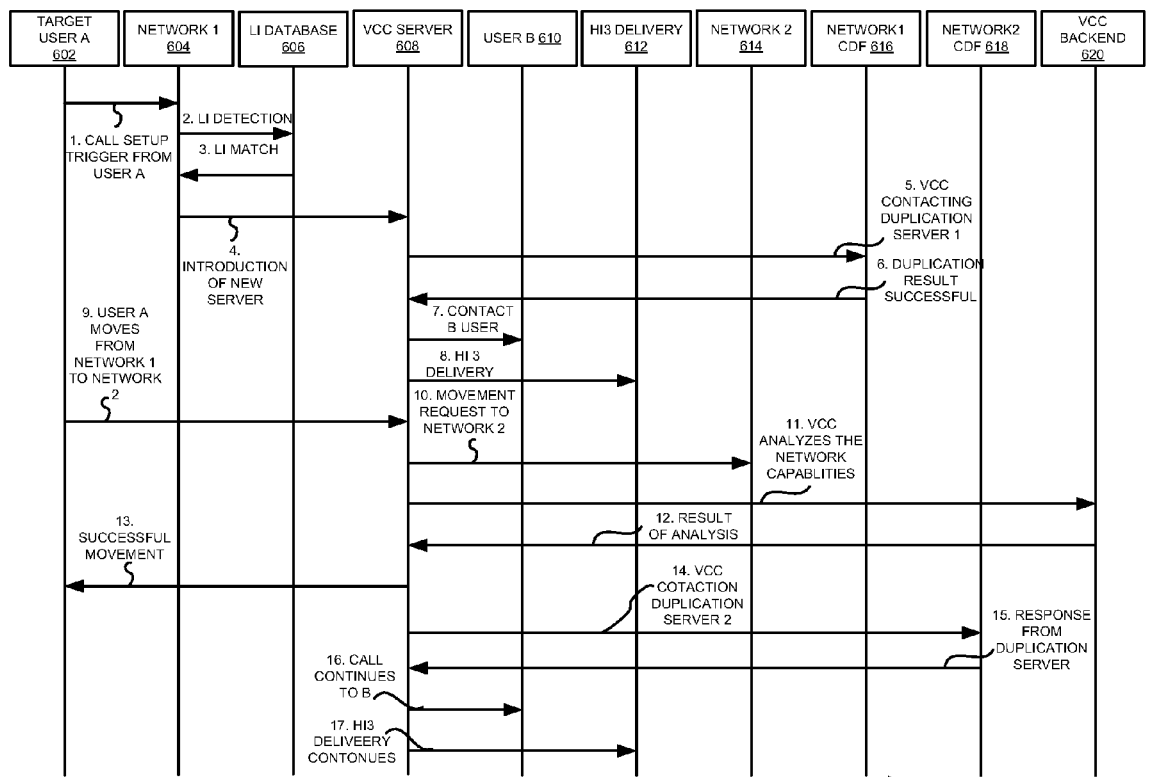
FIG. 6 is a sequence diagram illustrating sequential exchange of signals when providing the LI data in a VCC in a network-to-network movement scenario, according to another embodiment.

FIG. 6 is a sequence diagram 600 illustrating sequential exchange of signals when providing the LI data in VCC in a network-to-network movement scenario, according to another embodiment. As illustrated, the sequence diagram 600 includes a target user A 602, a first telecommunication network (herein after referred to as a network 1) 604, a LI database 606, a VCC server 608, a user B 610, HI3 delivery 612, a second telecommunication network (herein after referred to as a network 2) 614, a network 1 call duplication function (CDF) 616, a network 2 CDF 618, and a VCC backend 620.

In one embodiment, FIG. 6 depicts the sequence diagram comprising a number of steps as may be performed during the LI in the VCC when the target user A 602 moves from one network 1 604 to the network 2 614. In one embodiment, the network 2 614 is based on a technology that is different from the network 1 604. For example, if network 1 604 includes a Wi-Fi network then the network 2 614 includes a GSM network, and so on.

In step 1, the target user A 602 initiates/originates a call with the user b 610 using the network 1 604. In step 2, a check is made to recognize/detect whether the target user A 602 is listed in the LI database 606 associated with the network 1 604 for lawful interception. In other words, the LI database 606 is checked to see whether the target user's call needs to be tracked. In step 3, if the target user A 602 matches for LI (i.e., i.e., the target user's identity matches with an identity in the LI database 606 for LI), then a new VCC server 608 is introduced for tracking the speech information (i.e., LI data) of the target user A 602 in step 4.

In step 5, the VCC server 608 contacts a duplication server 1 which duplicates the target user's speech using a call duplication function (CDF) 616 associated with the network 1 604. Upon a successful duplication of the target user's speech in step 6, the VCC server 608 allows the target user A 602 to contact the user B 610 in step 7. In step 8, the lawful interception data (i.e., HI3) in the network 1 604 is delivered to the LEA via the LI gateway.

In step 9, the target user A 602 moves from the network 1 604 to network 2 614 which is based on the technology that is different from the network 1 604. In step 10, the VCC server 608 sends movement request to the network 2 614. In one example embodiment, the VCC server 608 detects the movement of the target user A 602 from the network 1 604 to the network 2 614 using the VCC backend 620 and corresponding X, Y and z co-ordinates of the target user A 602. In step 11, the VCC server 608 determines and analyzes the network properties associated with the network 2 614 using the VCC backend 620 when the target user A 602 moves to the network 2 614.

In step 12, the result of analyzing the network properties associated with the network 2 614 is sent to the VCC server 608. In step 13, the VCC server 608 successfully authenticates the movement of the target user A 602 to the network 2 614. In step 14, the VCC server 608 contacts a duplication server 2 which duplicates the target user's speech using a CDF 618 associated with the network 2 614. Upon a successful duplication of the target user's speech in step 14, the duplication server 2 sends the response of the CFD 618 associated with the network 2 614 to the VCC server 608 in step 15. Further in step 16, the target user A 602's call continues to the user B 610 via the network 2 614. In step 17, delivering the lawful interception data (i.e., HI3) in the network 2 614 to the LEA via the LI gateway is continued.

In this way, the interception is taken care by the CDF (i.e., the CDF 616 and CDF 618) that is present in both the networks (i.e., the network 1 604 and the network 2 614 respectively) be it the #7 signaling conversion of direct duplication of the packet.

Figure 7:
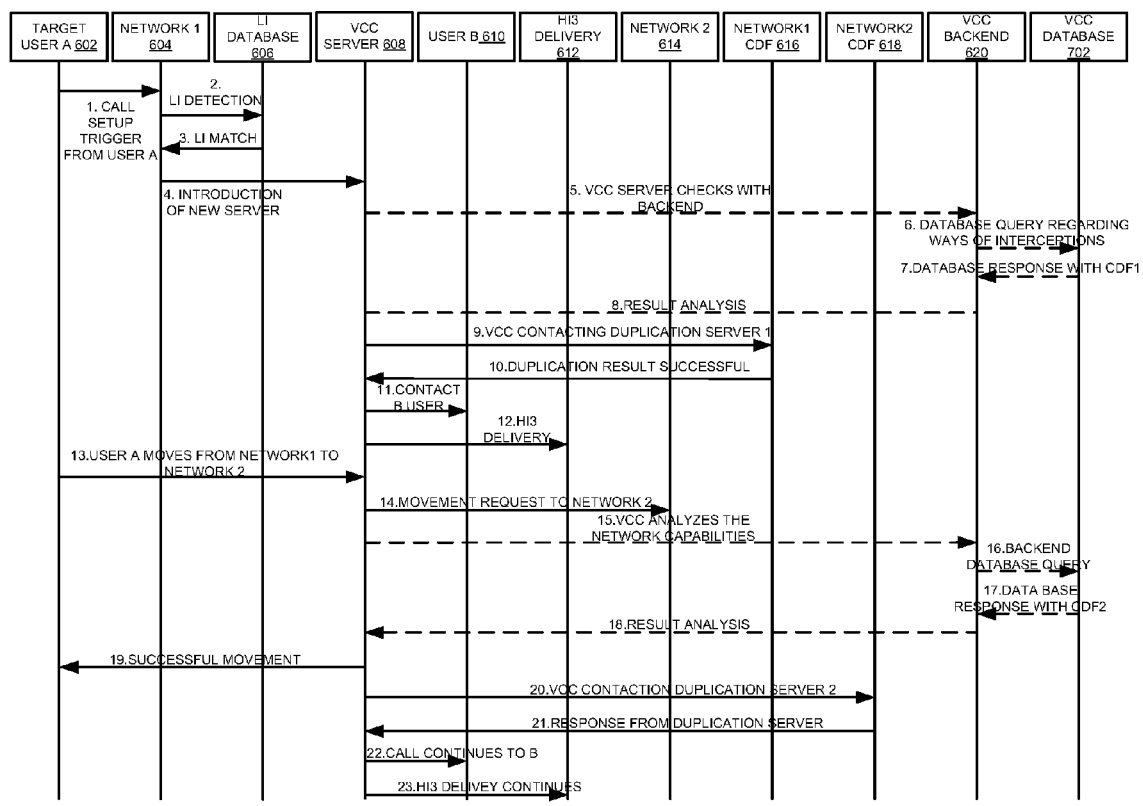
FIG. 7 is an enhanced sequence diagram illustrating a process in the VCC back end when providing the LI data in the VCC in the network-to-network movement scenario, such as those shown in FIG. 6, according to one embodiment.

FIG. 7 is an enhanced sequence diagram illustrating a process in the VCC back end when providing the LI data in the VCC in a network-to-network movement scenario, such as those shown in FIG. 6, according to one embodiment. As illustrated, the sequence diagram 700 includes the target user A 602, the first telecommunication network (herein after referred to as a network 1) 604, the LI database 606, the VCC server 608, the user B 610, the HI3 delivery 612, the second telecommunication network (herein after referred to as a network 2) 614, the network 1 call duplication function (CDF) 616, the network 2 CDF 618, the VCC backend 620, and a VCC database 702.

In one embodiment, the VCC backend 620 refers to a network which includes a VCC database 702 and a control algorithm based on a location of a particular area (i.e., using X, Y, and Z coordinates) of what are all the available networks and their intercepting techniques. Based on the request for the movement, the VCC communicates to the VCC server 608 of what and where to route the new request so that the VCC-LI is not lost.

In step 1, the target user A 602 initiates/originates a call with the user b 610 using the network 1 604. In step 2, a check is made to recognize/detect whether the target user A 602 is listed in the LI database 606 associated with the network 1 604 for lawful interception. In other words, the LI database 606 is checked to see whether the target user's call needs to be tracked. In step 3, if the target user A 602 matches for LI (i.e., i.e., the target user's identity matches with an identity in the LI database 602 for LI), then a new VCC server 608 is introduced for tracking the speech information (i.e., LI data) of the target user A 602 in step 4.

In step 5, the VCC server 608 contacts the VCC backend 620 to check the ways of intercepting the target user's call. In step 6, the VCC backend 620 queries the VCC database 702 regarding the ways of intercepting the target user's call. In step 7, the VCC database 702 responds to the VCC backend 620 with the CDF 1 for intercepting the target user's call. In step 8, the VCC backend 620 sends the result of the analysis (i.e., intercept using CDF 1) to the VCC server 608.

In step 9, the VCC server 608 contacts a duplication server 1 which duplicates the target user's speech using the CDF 1 616 associated with the network 1 604. Upon a successful duplication of the target user's speech in step 10, the VCC server 608 allows the target user A 602 to contact the user B 610 in step 11. In step 12, the lawful interception data (i.e., HI3) in the network 1 604 is delivered to the LEA via the LI gateway.

In step 13, the target user A 602 moves from the network 1 604 to network 2 614 which is based on a technology that is different from the network 1 604. In step 14, the VCC server 608 sends movement request to the network 2 614. In one example embodiment, the VCC server 608 detects the movement of the target user A 602 from the network 1 604 to the network 2 614 using the VCC backend 620 and corresponding X, Y and z co-ordinates of the target user A 602. In step 15, the VCC server 608 determines and analyzes the network properties associated with the network 2 614 using the VCC backend 620 when the target user A 602 moves to the network 2 614.

In step 16, the VCC backend 620 queries the VCC database 702 regarding the ways of intercepting the target user's call in the network 2 614. In step 17, the VCC database 702 responds to the VCC backend 620 with the CDF 2 for intercepting the target user's call.

In step 18, the result of analyzing the network properties associated with the network 2 614 is sent to the VCC server 608. In step 19, the VCC server 608 successfully authenticates the movement of the target user A 602 to the network 2 614. In step 20, the VCC server 608 contacts a duplication server 2 which duplicates the target user's speech using the CDF 618 associated with the network 2 614. Upon a successful duplication of the target user's speech in step 20, the duplication server 2 sends the response of the CFD 618 associated with the network 2 614 to the VCC server 608 in step 21. Further in step 22, the target user A 602's call continues to the user B 610 via the network 2 614. In step 23, delivering the LI data (i.e., HI3) in the network 2 614 to the LEA via the LI gateway is continued in the same format as that of the LI data sent from the network 1 604.

Therefore, the call setup is initiated from the target user A 602 is never lost and there is always continuous LI data delivery whereby LI is never lost. The VCC server 608 detects the movement of target user A 602 using the X, Y, Z co-ordinates that the target user A 602 moves and uses the same to identify which network the target user A 602 is going into.

The above described architecture is very easy to implement and can be adapted to any kind of network as there is no big change in the way the call handing is to happen and if done once then when new networks are added the same can be easily modified in the database. If there is a new network to be added then the same could be done easily by adding the new network configuration in the corresponding tables.

Further, the above technique described in FIGS. 4-7 provides the VCC server that lies directly in the path of the target user and the other user, and receives all the corresponding information about the network which the target user moves from the VCC backend and hence addresses VCC in case of LI in any kind of network. Furthermore, the above technique described in FIGS. 4-7 allows the target user to move between network and topologies as all information are fed and readily available for the VCC server from the VCC backend. Also, the above technique described in FIGS. 4-7 allows to place the new VCC server and the VCC backend as separate components in the network that take care of the CFD function of LI in case of VCC and hence there is no need to change the existing infrastructure. In this case, the VCC server and the VCC backend can be used to replicate the speech content of the target user and could provide the content to the LEA in the format required by the LEA without making any change in the network topology or architecture of the LEA.

An article comprising a non transitory computer readable storage medium having instructions thereon which when executed by a computer, cause the computer to perform the above described method. The method described in the foregoing may be in a form of a machine-readable medium embodying a set of instructions that, when executed by a machine, cause the machine to perform any method disclosed herein. It will be appreciated that the various embodiments discussed herein may not be the same embodiment, and may be grouped into various other embodiments not explicitly disclosed herein. For example, the VCC server may include a processor and a memory coupled to the processor. The memory includes the set of instruction for executing by the processor.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

In various embodiments, the above-described methods and systems of FIGS. 4 through 7 provides an easy to implement in the existing network topology and heterogeneous networks today, helps in preventing the LI call drop during VCC in a heterogeneous network, and also provides a smooth transfer and thus takes care of LI in case of VCC.

Further, the above-described methods can also be applicable for future network upgrades. Because once a new technology is introduced the VCC server and VCC backend can be adapted with the new technology by providing information about the new technology. The above-described methods provides a non intrusive solution because there is no change in packet header and no changes in the IP addresses and does not put any over head to the network and hence does not affect the performance of the network.

Although, the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method for providing voice call continuity (VCC) for lawful interception (LI) data, the method comprising:
    receiving, by a VCC device, a first duplicate of data associated with a voice call initiated by a user over a first telecommunication network in response to a first duplication request;
    detecting, by the VCC device, a movement of the user from the first telecommunication network to a second telecommunication network during the voice call;
    determining, by the VCC device, one or more network properties associated with the second telecommunication network;
    reconfiguring, by the VCC device, one or more network properties of the VCC device based on the determined one or more network properties associated with the second telecommunication network;
    receiving, by the VCC device, a second duplicate of the data associated with the voice call from the second telecommunication network in response to a second duplication request;
    delivering, by the VCC device, the received first and second duplicates of the voice call as the LI data to a law enforcement agency (LEA).

2. The method of claim 1 wherein the second telecommunication network is based on a technology that is different from the first telecommunication network.

3. The method of claim 1 wherein the received first and second duplicates of the voice call are delivered to the LEA in a format desired by the LEA.

4. The method of claim 1 wherein the received first and second duplicates of the voice call are delivered to the LEA through a lawful interception (LI) gateway.

5. The method of claim 1 wherein the data comprises speech information from the user.

6. The method of claim 1 further comprises delivering, by the VCC device, the data associated with the voice call to a second user.

7. A non-transitory computer-readable medium having stored thereon instructions for providing voice call continuity (VCC) for lawful interception (LI) data comprising machine executable code which, when executed by a processor, causes the processor to perform steps comprising:
    receiving a first duplicate of data associated with a voice call initiated by a user over a first telecommunication network in response to a first duplication request;
    detecting a movement of the user from the first, telecommunication network to a second telecommunication network during the voice call;
    determining one or more network properties associated with the second telecommunication network;
    reconfiguring one or more network properties of a VCC device based on the determined one or more network properties associated with the second telecommunication network;
    receiving a second duplicate of the data associated with the voice call from the second telecommunication network in response to a second duplication request; and
    delivering the received first, and second duplicates of the voice call as the LI data to a law enforcement agency (LEA).

8. The medium of claim 7 wherein the second telecommunication network is based on a technology that is different from the first telecommunication network.

9. The medium of claim 7 wherein the received first and second duplicates of the voice call are delivered to the LEA in a format desired by the LEA.

10. The medium of claim 7 wherein the received first and second duplicates of the voice call are delivered to the LLA through a lawful interception (LI) gateway.

11. The medium of claim 7 wherein the data comprises speech information from the user.

12. The medium of claim 7 further comprising machine executable code which, when executed by a processor, causes the processor to perform steps comprising delivering the data associated with the voice call to a second user.

13. A voice call continuity (VCC) device comprising
    a processor; and
    a memory coupled to the processor configured to execute programmed instructions stored in the memory comprising:
    receiving a first duplicate of data associated with a voice call initiated by a user over a first telecommunication network in response to a first duplication request;
    detecting a movement of the user from the first telecommunication network to a second telecommunication network during the voice call;
    determining one or more network properties associated with the second telecommunication network;
    reconfiguring one or more network properties of the VCC device based on the determined one or more network properties associated with the second telecommunication network;
    receiving a second duplicate of the data associated with the voice call from the second telecommunication network in response to a second duplication request; and
    delivering the received first and second duplicates of the voice call as the LI data to a law enforcement agency (LEA).

14. The device of claim 13 wherein the second telecommunication network is based on a technology that is different from the first telecommunication network.

15. The device of claim 13 wherein the received first and second duplicates of the voice call are delivered to the LEA in a format desired by the LEA.

16. The device of claim 13 wherein the received first and second duplicates of the voice call are delivered to the LEA through a lawful interception (LI) gateway.

17. The device of claim 13 wherein the data comprises speech information from the user.

18. The device of claim 13 wherein the processor is further configured to execute programmed instructions stored in the memory for delivering the data associated with the voice call to a second user.

* * * * *